United States Patent
Chen et al.

(10) Patent No.: US 10,831,751 B2
(45) Date of Patent: Nov. 10, 2020

(54) QUERY PARALLELISM METHOD

(71) Applicant: International Business Machines Corporation, Armonk, NY (US)

(72) Inventors: Xiao Xiao Chen, Beijing (CN); Shuo Li, Beijing (CN); Heng Liu, Beijing (CN); Liu Wang, Beijing (CN); Hong Mei Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 321 days.

(21) Appl. No.: 15/333,257

(22) Filed: Oct. 25, 2016

(65) Prior Publication Data

US 2018/0113902 A1    Apr. 26, 2018

(51) Int. Cl.
*G06F 16/00* (2019.01)
*G06F 16/2453* (2019.01)

(52) U.S. Cl.
CPC ............... *G06F 16/24535* (2019.01)

(58) Field of Classification Search
CPC ......... G06F 17/30424; G06F 17/30477; G06F 17/30412; G06F 17/30445; G06F 17/30451; G06F 17/30554; G06F 17/30392; G06F 17/30427; G06F 17/30675; G06F 17/30967; G06F 17/30539; Y10S 707/99931; Y10S 707/99932; Y10S 707/99934; Y10S 707/99937
See application file for complete search history.

(56) References Cited

U.S. PATENT DOCUMENTS

| | | | |
|---|---|---|---|
| 5,933,837 A * | 8/1999 | Kung | G06F 17/30545 707/635 |
| 6,058,389 A * | 5/2000 | Chandra | G06F 16/252 |
| 7,574,424 B2 | 8/2009 | Chowdhuri | |
| 8,572,051 B1 | 10/2013 | Chen et al. | |
| 9,256,642 B2 | 2/2016 | Yu et al. | |
| 2009/0083238 A1 | 3/2009 | Chaudhuri et al. | |
| 2009/0282225 A1* | 11/2009 | Caprioli | G06F 9/3826 712/225 |
| 2010/0082655 A1* | 4/2010 | Silberstein | G06F 17/30477 707/759 |

(Continued)

OTHER PUBLICATIONS

Anonymous, "Parallel Execution of SQL Statements", https://docs.oracle.com/cd/B10500_01/server.920/a96524/c20paral.htm.

(Continued)

*Primary Examiner* — Augustine K. Obisesan
(74) *Attorney, Agent, or Firm* — North Shore Patents, P.C.; Joseph L. Acayan

(57) ABSTRACT

A system optimizes performance of parallel queries by dividing a query into a plurality of sub queries. The query is divided according to a plurality of data ranges associated with the query. The system creates an available queue, and a defer queue. The system assigns the plurality of sub queries into the available queue. The system then processes, in parallel, the plurality of sub queries in the available queue. During the processing, if the system determines that a data range associated with a sub query comprises unavailable data, the system assigns the sub query to the defer queue as a defer range sub query. After completing the processing of the plurality of sub queries in the available queue, the system processes a plurality of defer range sub queries in the defer queue.

20 Claims, 12 Drawing Sheets

(56) References Cited

U.S. PATENT DOCUMENTS

| | | | | |
|---|---|---|---|---|
| 2010/0153963 A1* | 6/2010 | Kakarlamudi | ........ | G06F 9/5083 |
| | | | | 718/105 |
| 2014/0280034 A1* | 9/2014 | Harris | ............... | G06F 17/30451 |
| | | | | 707/718 |
| 2014/0310258 A1 | 10/2014 | Tian | | |
| 2015/0066880 A1 | 3/2015 | Chai et al. | | |
| 2015/0154050 A1* | 6/2015 | Edelstein | .............. | G06F 9/4881 |
| | | | | 718/106 |

OTHER PUBLICATIONS

Chen, "A Selective Checkpointing Mechanism for Query Plans in a Parallel Database System", http://ieeexplore.ieee.org/xpl/articleDetails.jsp?arnumber=6691580.

Upadhyaya, "A Latency and Fault-Tolerance Optimizer for Online Parallel Query Plans", http://homes.cs.washington.edu/~magda/papers/upadhyaya-sigmod11.pdf.

* cited by examiner

QUERY PARALLELISM METHOD

BACKGROUND

In database operations, queries may be divided and run in parallel to execute the queries faster. The queries may be divided into sub queries according to the ranges of data specified by the queries, and then those sub queries executed. If the data range associated with a sub query is unavailable, the query will fail, possibly leaving available data in the other sub queries unprocessed. Therefore, it would be helpful to process queries in parallel while managing both available and unavailable data.

SUMMARY

According to an embodiment of the present invention, in a method for optimizing performance of parallel queries, the method divides a query into a plurality of sub queries, where the query is divided according to a plurality of data ranges associated with the query. The method creates an available queue, and a defer queue. The method assigns the plurality of sub queries to the available queue, and processes, in parallel, the plurality of sub queries in the available queue. During the processing, the method determines a data range associated with a sub query comprises unavailable data, and assigns the sub query to the defer queue as a defer range sub query. After completing the processing of the plurality of sub queries in the available queue, the method processes a plurality of defer range sub queries in the defer queue.

In an example embodiment, when the method assigns the sub query to the defer queue as the defer range sub query, the method continues to process the plurality of sub queries in the available queue after assigning the defer range sub query to the defer queue.

In an example embodiment, when the method processes the plurality of defer range sub queries in the defer queue, the method determines a data range associated with at least one defer range sub query comprises available data. The method assigns the defer range sub query to the available queue as an available range sub query, and processes the plurality of available range sub queries in the available queue.

In an example embodiment when the method processes the plurality of defer range sub queries in the defer queue, the method determines that a respective data range associated with each of the defer range sub queries comprises unavailable data. The method waits a predetermined period of time, assigns each of the defer range sub queries to a catalog table, and ends the processing of the query.

In an example embodiment, when the method waits the predetermined period of time, the method determines a data range associated with at least one defer range sub query in the defer queue comprises available data. The method assigns the defer range sub query to the available queue as an available range sub query. The method then restarts the processing of the query by processing at least one of the defer range sub queries in the catalog table when the respective data range associated with the defer range sub queries comprises available data.

In an example embodiment, when the method processes at least one of the defer range sub queries in the catalog table, the method assigns at least one of the defer range sub queries in the catalog table to the available queue as an available range sub query, and then processes the plurality of available range sub queries in the available queue.

System and computer program products corresponding to the above-summarized methods are also described and claimed herein.

DETAILED DESCRIPTION

Figure 1:
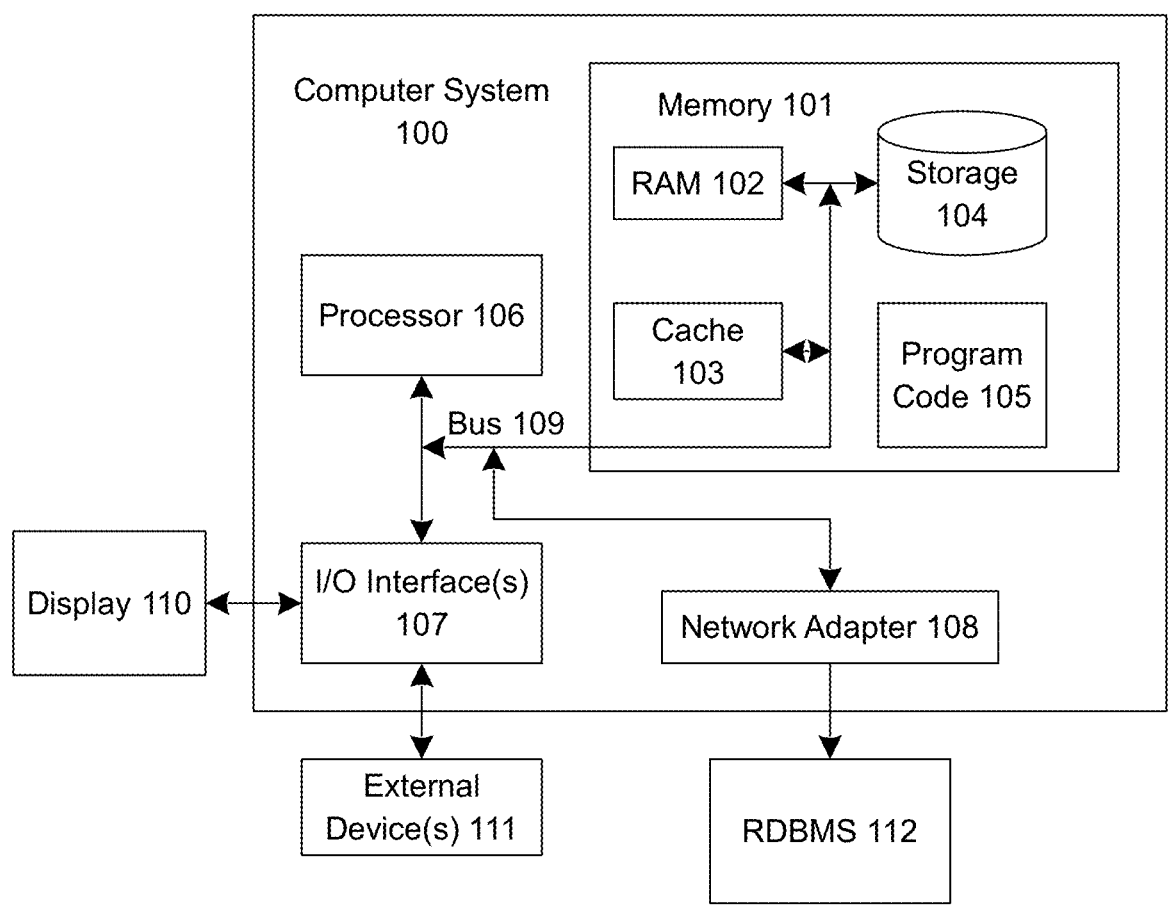
FIG. 1 illustrates an embodiment of a system for optimizing performance of parallel queries, according to embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 illustrates a system for optimizing performance of parallel queries according to embodiments disclosed herein. The computer system 100 is operationally coupled to a processor or processing units 106, a memory 101, and a bus 109 that couples various system components, including the memory 101 to the processor 106. The bus 109 represents one or more of any of several types of bus structure, including a memory bus or memory controller, a peripheral bus, an accelerated graphics port, and a processor or local bus using any of a variety of bus architectures. The memory 101 may include computer readable media in the form of volatile memory, such as random access memory (RAM) 102 or cache memory 103, or non-volatile storage media 104. The memory 101 may include at least one program product having a set of at least one program code module 105 that are configured to carry out the functions of embodiment of the present invention when executed by the processor 106. The computer system 100 may also communicate with one or more external devices 111, such as a display 110, via I/O interfaces 107. The computer system 100 may communicate with one or more networks via network adapter 108. The computer system 100 may communicate with one or more databases 112 via network adapter 108.

Figure 2:
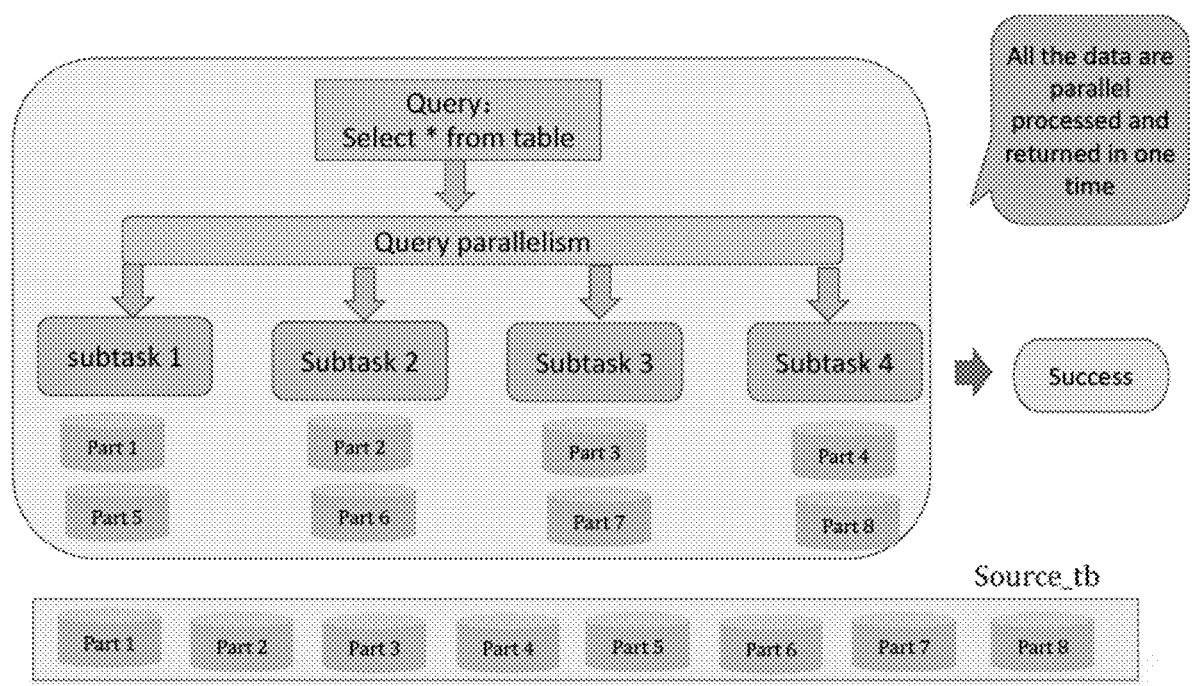
FIG. 2 illustrates an example of successful parallel processing, according to embodiments disclosed herein.

FIG. 2 illustrates an example of successful parallel processing. In parallel processing, a query is divided into sub queries, shown as Part 1 through Part 8. Typically, all the data is processed in parallel and returned in one time.

Figure 3:
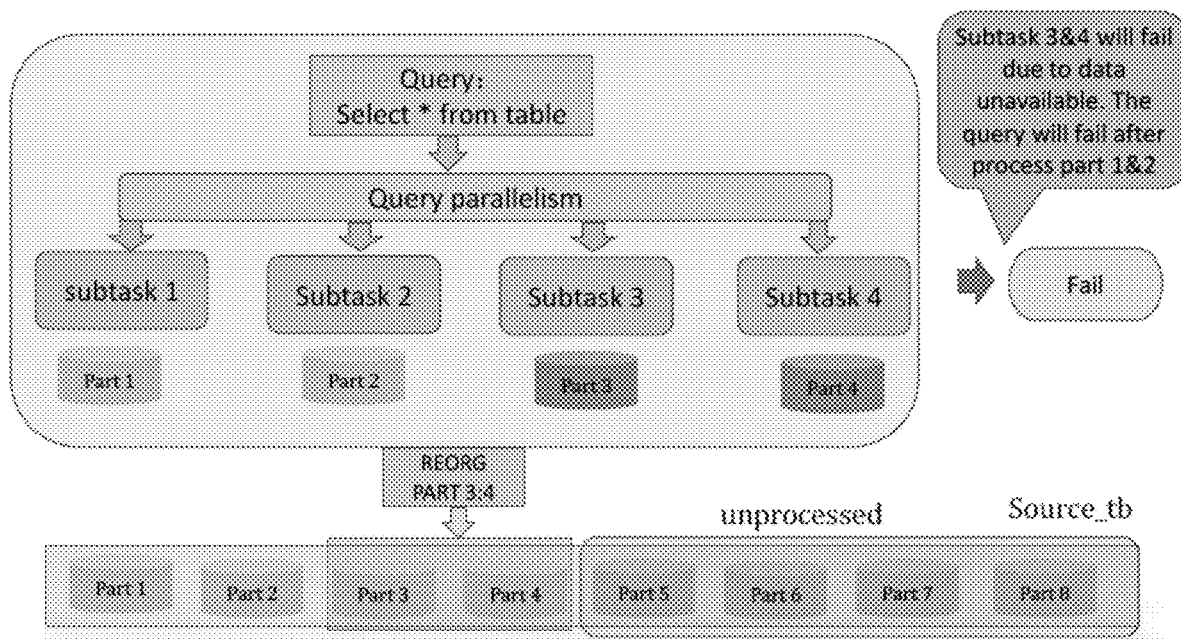
FIG. 3 illustrates an example of unsuccessful parallel processing due to unavailable data, according to embodiments disclosed herein.

FIG. 3 illustrates an example of unsuccessful parallel processing due to unavailable data. If any of the sub queries try to access data that is unavailable (illustrated as sub query Part 3 and sub query Part 4), those sub queries will fail. The execution of the query may fail due to the unavailable data accessed by sub queries Part 3 and Part 4, despite the successful processing of the sub queries shown as Part 1 and Part 2.

Figure 4:
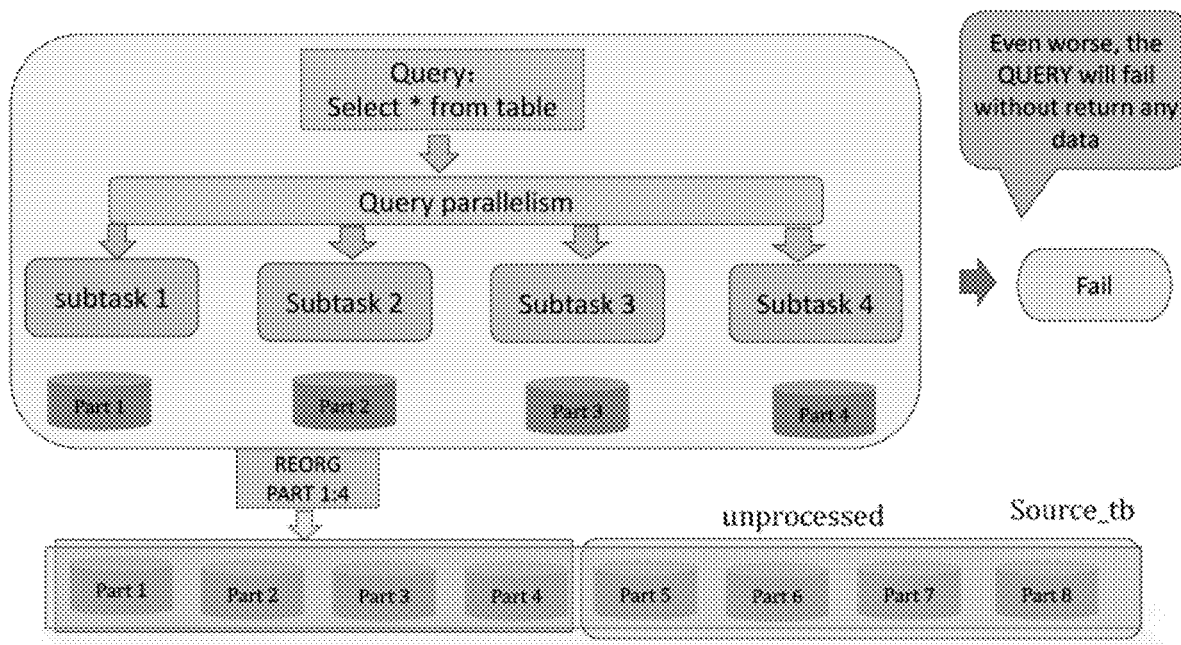
FIG. 4 illustrates an example of a query that failed due to unavailable data, according to embodiments disclosed herein.

FIG. 4 illustrates an example of a query that failed due to unavailable data. In this example scenario, the entire query failed without returning any data due to at least one of the sub queries attempting to access data that was unavailable.

Figure 5:
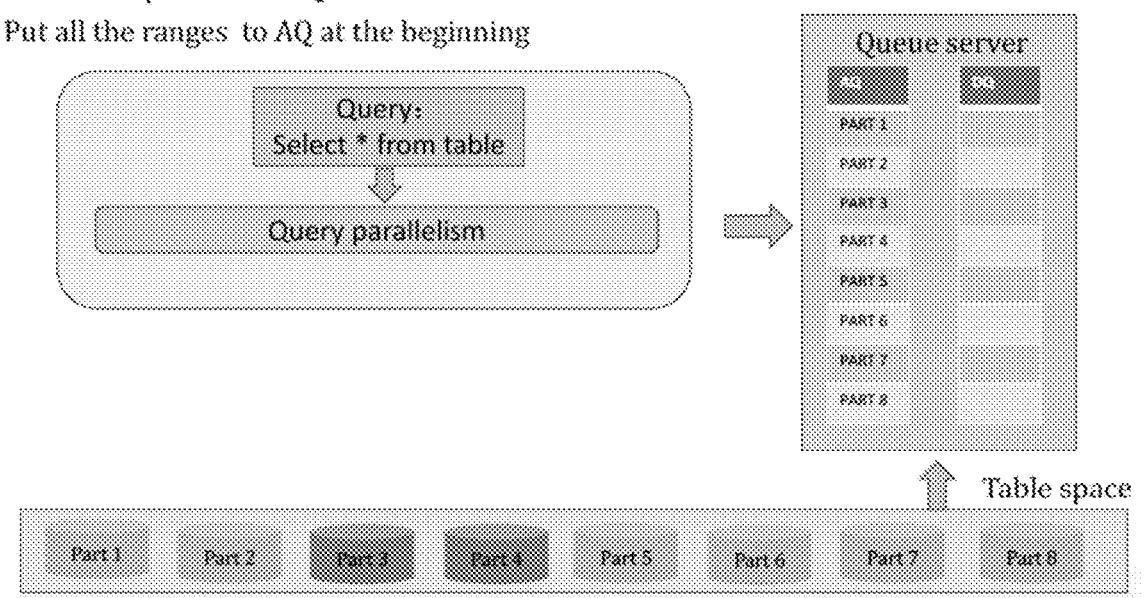
FIG. 5 illustrates an example of parallel processing a query using an available queue, according to embodiments disclosed herein.

FIG. 5 illustrates an example of parallel processing a query using an available queue. In this example embodiment, all of the sub queries, Part 1 through Part 8, are assigned to the available queue (AQ) on a queue server. The system processes the sub queries assigned to the available queue (AQ) by executing those sub queries. The sub queries each process a data range of the query.

Figure 6:
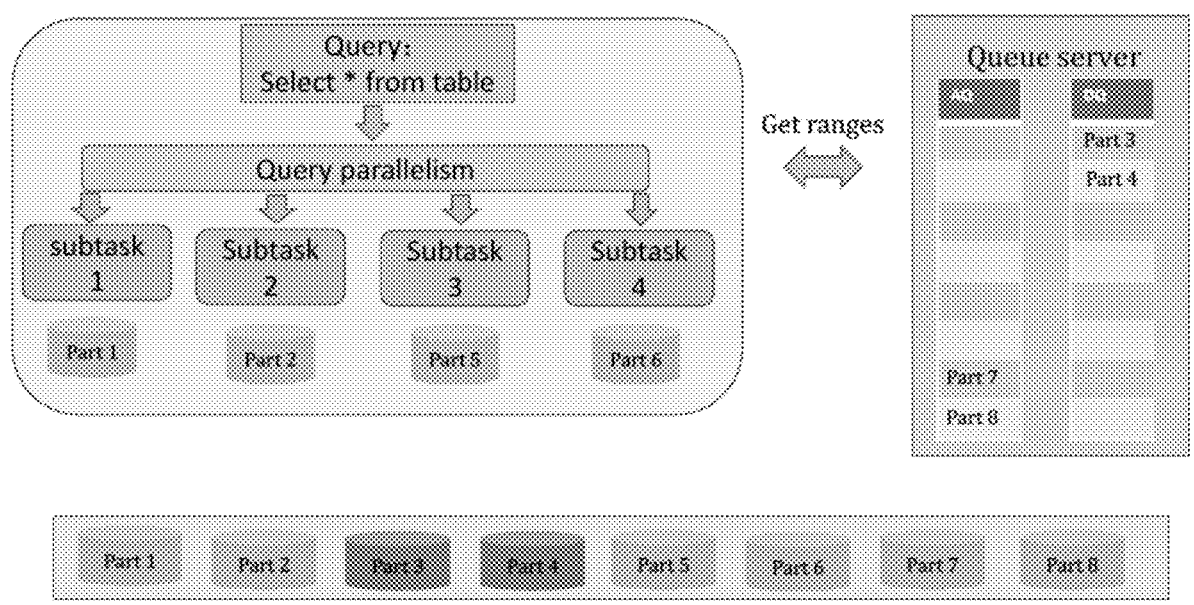
FIG. 6 illustrates an example of parallel processing a query using a defer queue for unavailable data, according to embodiments disclosed herein.

FIG. 6 illustrates an example of parallel processing a query using a defer queue for unavailable data. As the system processes the sub queries in the available queue (AQ), any sub queries that attempt to access data ranges associated with unavailable data, shown here as sub query Part 3 and sub query Part 4, are assigned to the defer queue (DQ) on the queue server. In the database management systems (DBMS) that is executing the sub queries in parallel, there are one or more sub tasks that each process multiple sub queries of the query. Each sub task processes one sub query (i.e., one data range) from the available queue (AQ) at a time. Thus, the available data is processed first, in parallel. When the system encounters a sub query attempting to access unavailable data, instead of waiting for the data range (of unavailable data) to become available, the system assigns the sub query to the defer queue (DQ) until the data range becomes available. The system then continues to process those unprocessed sub queries in the available queue (AQ). For example, the system obtains a sub query from the available queue (AQ), and transmits the sub query from the queue server to the DBMS for execution of the sub query. In an example embodiment, the system creates the available queue (AQ) and the defer queue (DQ) on at least one queue server. The queue server(s) may reside on the same or different computers.

Figure 7:
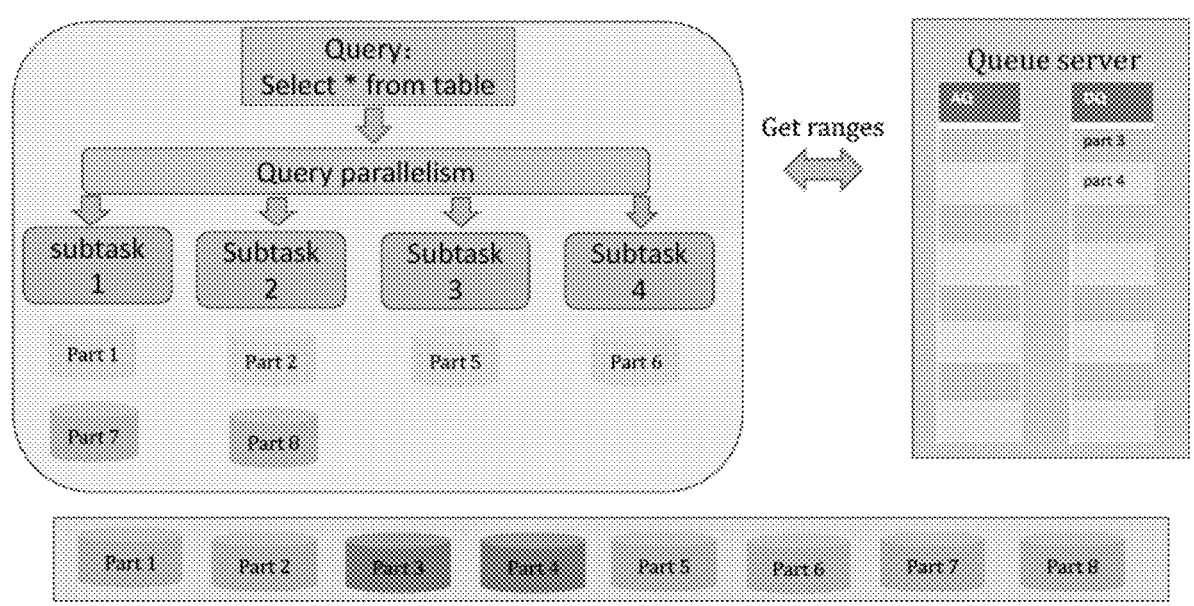
FIG. 7 illustrates an example of parallel processing the sub queries in the available queue, according to embodiments disclosed herein.

FIG. 7 illustrates an example of parallel processing the sub queries in the available queue (AQ). After the sub queries in the available queue (AQ) are processed, the system, for example, running an application operating on the processor 106, obtains the data ranges associated with the sub queries in the defer queue (DQ) to determine if any of the data in those data ranges has now become available. In other words, when all the sub queries assigned to the available queue (AQ) are processed, the system begins to process the sub queries assigned to the defer queue (DQ).

Figure 8:
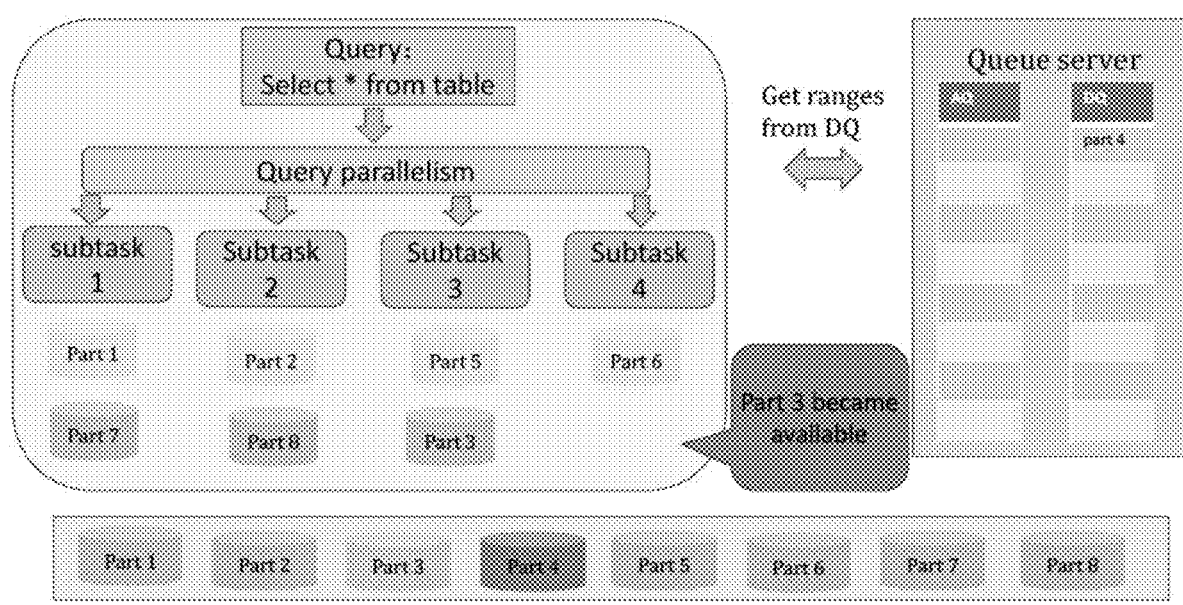
FIG. 8 illustrates an example of assigning sub queries in the defer queue to the available queue when the data becomes available, and processing those sub queries, according to embodiments disclosed herein.

FIG. 8 illustrates an example of assigning sub queries in the defer queue (DQ) to the available queue (AQ) when the data becomes available, and processing those sub queries. In this example embodiment, the system determines that the data range accessed by sub query Part 3 has become available. The system then deletes sub query Part 3 from the defer queue (DQ), assigns sub query Part 3 to the available queue (AQ), and then processes sub query Part 3. For example, the system transmits sub query Part 3 from the available queue (AQ) on the queue server to the DBMS for execution of sub query Part 3.

Figure 9:
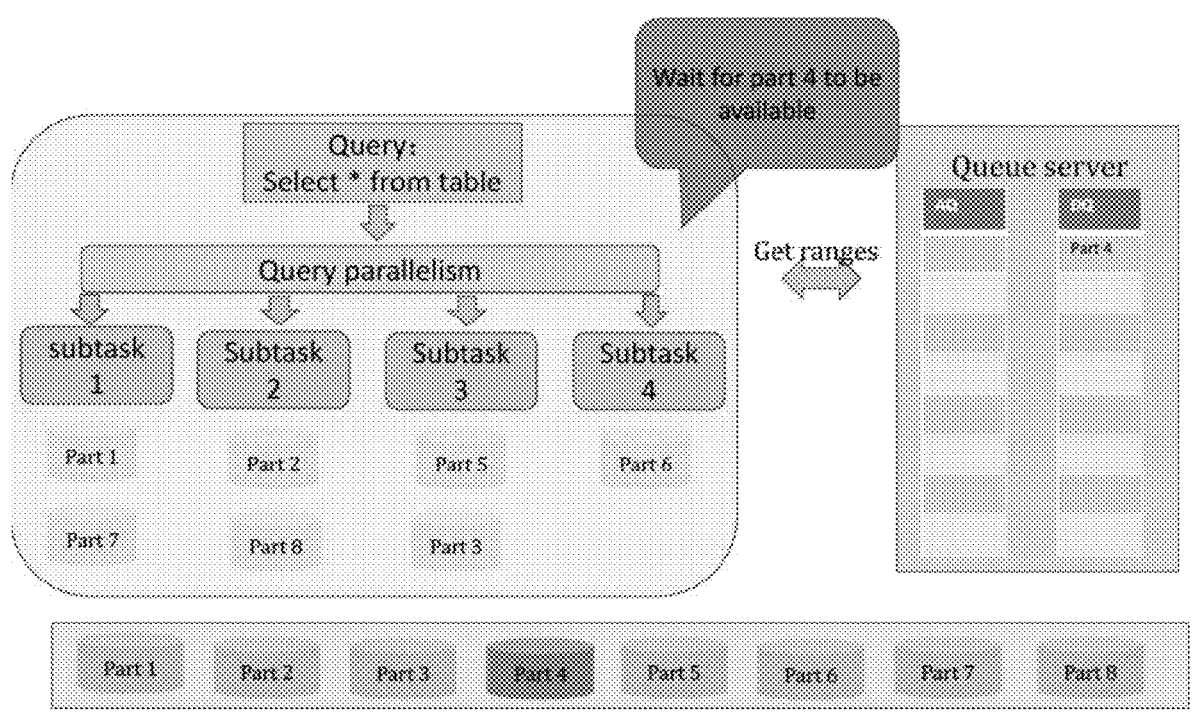
FIG. 9 illustrates an example of waiting a predetermined period of time, according to embodiments disclosed herein.

FIG. 9 illustrates an example of waiting a predetermined period of time. In this example embodiment, the system waits a predetermined period of time for the data range accessed by sub query Part 4 to become available. In other words, when all the sub queries assigned to the available queue (AQ) are processed, the system begins to process the sub queries assigned to the defer queue (DQ). If the data range accessed by a sub query in the defer queue (DQ) is unavailable, the system may wait for the data to become available. The system may wait a predetermined period of time, for example, set by the DBMS in the ZPARM parameter.

Figure 10:
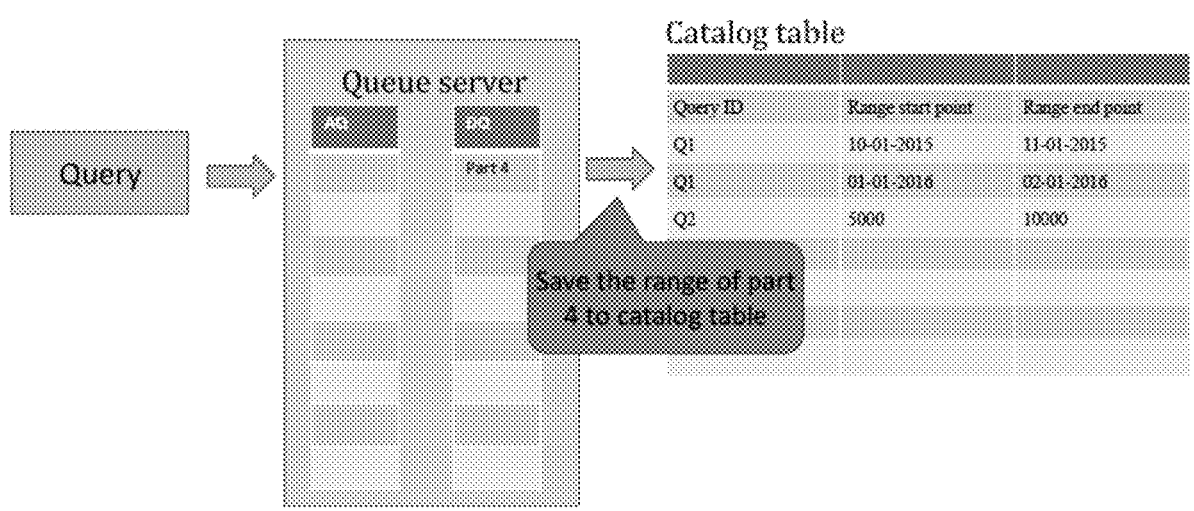
FIG. 10 illustrates an example of assigning the defer range sub queries to a catalog table, according to embodiments disclosed herein.

FIG. 10 illustrates an example of assigning the defer range sub queries to a catalog table. As noted above, if the data range accessed by a sub query in the defer queue (DQ) is unavailable, the system may wait a predetermined period of time for the data to become available. After waiting the predetermined period of time, if the data range accessed by sub query Part 4 is still unavailable, the system saves the data ranges associated with sub query Part 4 to the catalog table. The system may then restart the query at a later time to process only those data ranges stored in the catalog table to avoid re-processing data that has already been processed.

Figure 11:
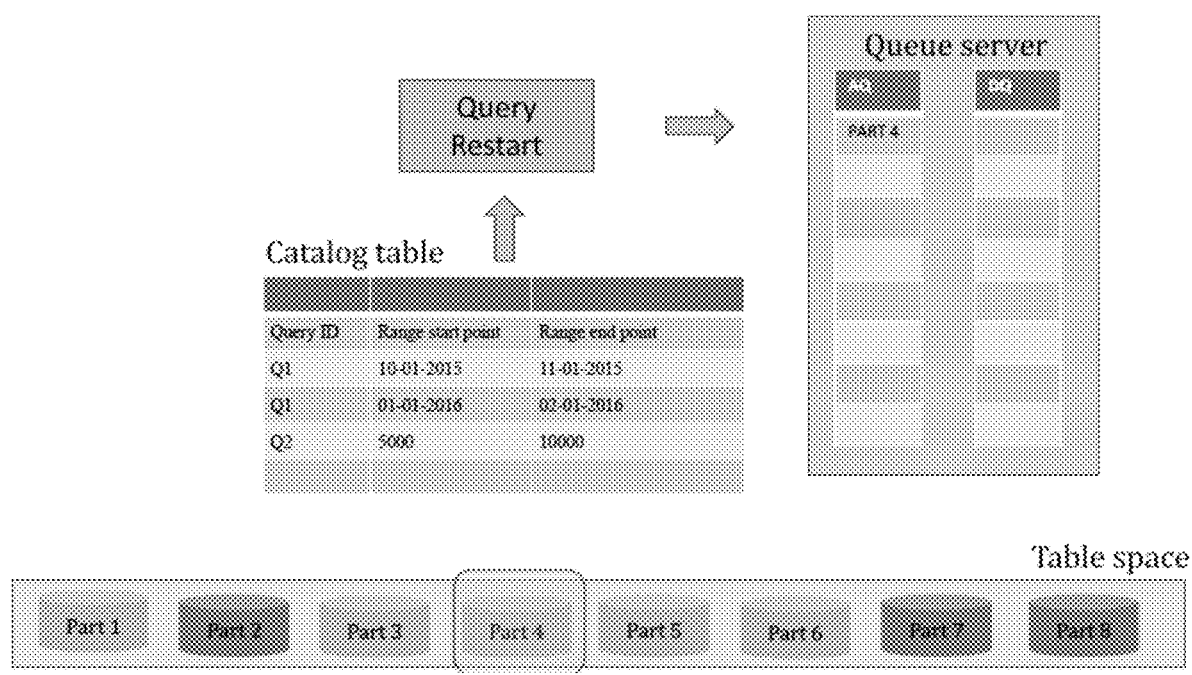
FIG. 11 illustrates an example of restarting the query and processing the defer range sub queries in the catalog table, according to embodiments disclosed herein.

FIG. 11 illustrates an example of restarting the query and processing the defer range sub queries in the catalog table. In this example scenario, the system restarts the query and processes any sub queries that have data ranges saved to the catalog table. The system assigns those sub queries (that access the data ranges saved to the catalog table) to the available queue (AQ). For example, the system has assigned the sub query Part 4 to the available queue (AQ). Thus, when the query is re-started, only the data ranges stored in the catalog table are processed. This avoids processing again sub queries that have already been executed by the DBMS.

Figure 12:
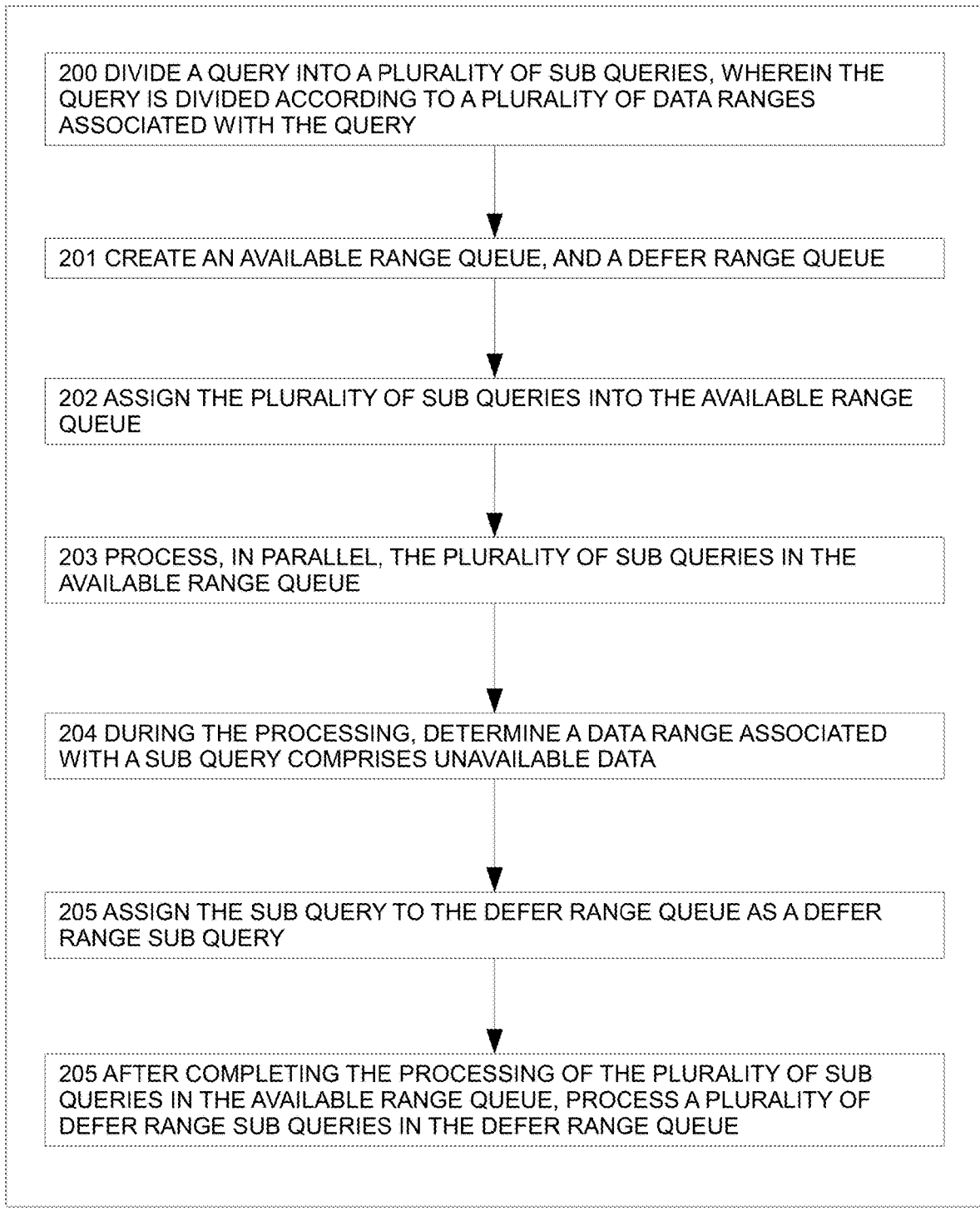
FIG. 12 is a flowchart illustrating an embodiment of a method for optimizing performance of parallel queries, according to embodiments disclosed herein.

FIG. 12 illustrates an embodiment of a method for optimizing performance of parallel queries. At 200, the method, via the processor 106, divides a query into a plurality of sub queries. The query is divided according to a plurality of data ranges associated with the query. For example, the query may be divided into sub queries according to the data ranges accessed by the query. The query may also be divided into more sub queries than parallel processes on the DBMS, meaning each of the parallel processes (shown as sub tasks 1 through 4 in FIG. 6, for example) executes multiple sub queries during the processing of the query. Dividing the query into smaller sub queries, and processing the sub queries concurrently reduces the overall execution time of the query. As each of the sub queries executes, the results of those sub queries are returned/outputted by the DBMS, and may be displayed, for example, to a user.

At 201, the method creates an available queue (AQ), and a defer queue (DQ) on a queue server. At 202, the method assigns the plurality of sub queries into the available queue (AQ). FIG. 5 illustrates an example queue server that comprises an available queue (AQ) and a defer queue (DQ). In this example embodiment, the plurality of sub queries, Part 1 through Part 8, are assigned to the available queue (AQ). The available queue (AQ) and/or the defer queue (DQ) may reside on the same computer as the system executing the method, or on a different computer.

At 203, the method processes, in parallel, the plurality of sub queries in the available queue (AQ). FIG. 6 illustrates an example embodiment where the method processes the sub queries in the available queue (AQ). In this example embodiment, the sub queries shown in FIG. 5 in the available queue (AQ), Part 1, Part 2, Part 5 and Part 6 have been processed. In an example embodiment, the method determines there are unprocessed sub queries in the available queue (AQ), and assigns each unprocessed sub query to a subtask on the DBMS for processing.

At 204, during the processing, the method determines a data range associated with a sub query comprises unavailable data, and at 205, the method assigns the sub query to the defer queue (DQ) as a defer range sub query, instead of failing the execution of the query. The method then continues to process the sub queries in the available queue (AQ) that access available data ranges. Thus, the method processes the available data first. The method also significantly reduces query failures, if not eliminates query failures, even when data ranges are unavailable, by assigning the sub queries that attempt to access unavailable data to the defer queue (DQ) and continuing to process those sub queries in the available queue (AQ) that access available data. In an example embodiment, the method begins to process the sub queries in the available queue (AQ). The method obtains the data ranges that those sub queries in the available queue (AQ) access. If the data range is available, for example, as shown in FIG. 6, and illustrated as sub queries Part 1, Part 2, Part 5 and Part 6, the method processes those sub queries in parallel (i.e., those sub queries are executed by the DBMS). If the method determines that the data ranges the sub queries access are unavailable, the method assigns those sub queries to the defer queue (DQ), as shown in FIG. 6, and illustrated as sub query Part 3 and sub query Part 4. In an example embodiment, the method determines if the data range accessed by the sub query is available. If the data range is available, the sub query is processed and data is returned from the database. In other words, the method assigns the sub query to a sub task on the DBMS for processing. If the data range is not available, for example, due to another concurrently running application, the method assigns the sub query to the defer queue (DQ).

At 205, after completing the processing of the plurality of sub queries in the available queue (AQ), the method processes a plurality of defer range sub queries in the defer queue (DQ). FIG. 7 illustrates an example embodiment where the method has completed the processing of the plurality of sub queries in the available queue (AQ), illustrated as Part 1, Part 2, Part 5, Part 6, Part 7 and Part 8. The method then processes the plurality of defer range sub queries assigned to the defer queue (DQ), and illustrated as sub query Part 3 and sub query Part 4. In an example embodiment, as shown in FIG. 8, the method obtains the data ranges associated with the sub queries assigned to the defer queue (DQ). In this example embodiment, while the method was processing the sub queries in the available queue (AQ), the data range associated with the sub query illustrated as Part 3 became available. The method then moves the sub query illustrated as Part 3 from the defer queue (DQ) to the available queue (AQ), and processes sub query Part 3. In an example embodiment, when all the sub queries in the available queue (AQ) are processed, if there are any sub queries in the defer queue (DQ), the method begins to process the sub queries in the defer queue (DQ), otherwise, the query ends. When there are no sub queries left in the defer queue (DQ) to process, the query ends.

In an example embodiment, when the method assigns the sub query to the defer queue (DQ) as the defer range sub query, the method continues to process the plurality of sub queries in the available queue (AQ) after assigning the defer range sub query to the defer queue (DQ). Thus, the query does not fail even if data is unavailable.

In an example embodiment, when the method processes the plurality of defer range sub queries in the defer queue (DQ), the method determines a data range associated with at least one defer range sub query comprises available data. As shown in FIG. 7, the method determines the data ranges associated with the sub queries in the defer queue (DQ), illustrated as Part 3 and Part 4. If the method determines that the data range associated with any of the sub queries in the defer queue (DQ) is available, the method assigns those defer range sub queries to the available queue (AQ) as an available range sub query, and then processes the plurality of available range sub queries in the available queue (AQ). As shown in FIG. 7, sub queries Part 3 and Part 4 were assigned to the defer queue (DQ). As shown in FIG. 8, the data range associated with sub query Part 3 became available. The method assigned sub query Part 3 from the defer queue (DQ) to the available queue (AQ), and then processed sub query Part 3.

In an example embodiment, when the method processes the plurality of defer range sub queries in the defer queue (DQ), the method determines a respective data range associated with each of the defer range sub queries comprises unavailable data, and waits a predetermined period of time. As shown in FIG. 9, the method determines the data ranges associated with the sub queries in the defer queue (DQ). If the data is still unavailable, the method waits a predetermined period of time as shown in FIG. 9, and illustrated as sub query Part 4. In an example embodiment, the predetermined period of time may be set within the DBMS in the ZPARM parameter. In another example embodiment, a user may also set the predetermined period of time. If, after the predetermined period of time, the data ranges associated with one or more sub queries in the defer queue (DQ) are still not available, the method assigns each of those defer range sub queries to a catalog table, as shown in FIG. 10. The catalog table may reside on the same computer as the system running the method, or on a different computer. In this example embodiment, the sub query illustrated as Part 4 is saved in the catalog table as a series of data ranges identified with a Query ID (illustrated as Q1, and Q2), a range start point, and a range end point. The method then ends the processing of the query. In an example embodiment, the method re-starts the processing of the query by processing at least one of the data ranges in the catalog table when that data range becomes available. As shown in FIG. 11, the method restarts the query and processes the sub queries associated with the data ranges in the catalog table when the data ranges associated with those sub queries become available. Thus, the method only executes the unprocessed portions of the query. Otherwise, a database administrator might have to re-execute the entire query (re-processing already processed data), or the database administrator might have to determine which portions of the query were not processed, and write another query to process only that data which was not yet processed.

In an example embodiment, when the method processes at least one of the defer range sub queries in the catalog table, the method assigns at least one of the defer range sub queries in the catalog table to the available queue (AQ) as an available range sub query, and processes the plurality of available range sub queries in the available queue (AQ). In other words, as the data ranges of the sub queries in the catalog table become available, the method moves those sub queries to the available queue (AQ), and then processes those sub queries. In an example embodiment, when the method restarts the query, the method parses the query statement. The method then determines whether the query is capable of being restarted. If the query is capable of being restarted and there are range start points and range end points associated with the Query ID that corresponds to the restarted query in the catalog table, the method will restart the processing of the query. The method will process the query for those data ranges identified by the range start points and range end points, and will delete those range start points and range end points from the catalog table. In another example embodiment, the method processes the query as described above using the available queue (AQ) and the defer queue (DQ). In other words, when the method restarts the query, the method moves the sub queries associated with the Query ID into the available queue (AQ) and processes the sub query as described above. Thus, the method processes available data first, concurrently, and then processes the unavailable data when it becomes available data, also concurrently. Finally, the method processes the data identified in the catalog table, while avoiding duplicating the workload. The query is processed efficiently, without duplicating the processing of any of the data, and the query does not fail due to unavailable data.

In an example embodiment, when the method waits the predetermined period of time, the method determines that a data range associated with at least one defer range sub query in the defer queue (DQ) comprises available data. The method then assigns at least one defer range sub query to the available queue (AQ) as an available range sub query. In other words, while the method waits the predetermined period of time, if a data range associated with a sub query becomes available, the method assigns that sub query to the available queue (AQ), deletes the sub query from the defer queue (DQ), and then processes that sub query.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of optimizing performance of parallel queries, the method comprising:
   dividing a query into a plurality of sub queries, wherein the query is divided according to a plurality of data ranges associated with the query;
   creating an available queue and a defer queue, wherein the defer queue includes one or more of the sub queries that attempt to access data ranges associated with unavailable data;
   assigning the plurality of sub queries into the available queue;
   processing, in parallel, the plurality of sub queries in the available queue;
   during the processing, determining a data range associated with a sub query that has attempted to access a data range associated with unavailable data;
   assigning the sub query to the defer queue as a defer range sub query;
   assigning the defer range sub query to a catalog table if the data range associated with the defer range sub query in the defer queue is still not available after a predetermined period of time, wherein the catalog table stores a query identifier, a range start point, and a range end point associated with the defer range sub query;
   determining if any of the data in the data range associated with the unavailable data has become available;
   assigning the defer range sub query in the defer queue to the available queue in response to the unavailable data becoming available; and
   after completing the processing of the plurality of sub queries in the available queue, processing a plurality of defer range sub queries in the defer queue.

2. The method of claim 1 wherein assigning the sub query to the defer queue as the defer range sub query comprises:
   continuing to process the plurality of sub queries in the available queue after assigning the defer range sub query to the defer queue.

3. The method of claim 1 wherein processing the plurality of defer range sub queries in the defer queue comprises:
   determining a data range associated with at least one defer range sub query comprises available data;
   assigning the at least one defer range sub query to the available queue as an available range sub query; and
   processing the plurality of available range sub queries in the available queue.

4. The method of claim 1, further comprising:
   ending the processing of the query after the defer range sub query is assigned to the catalog table; and
   restarting the processing of the query by processing at least one of the defer range sub queries in the catalog table when the respective data range associated with the defer range sub query becomes available.

5. The method of claim 4 wherein waiting the predetermined period of time comprises:
   determining a data range associated with at least one defer range sub query in the defer queue comprises available data; and
   assigning the at least one defer range sub query to the available queue as an available range sub query.

6. The method of claim 4 further comprising:
   restarting the processing of the query by processing at least one of the defer range sub queries in the catalog table when the respective data range associated with the at least one of the defer range sub queries comprises available data.

7. The method of claim 6 wherein processing the at least one of the defer range sub queries in the catalog table comprises:
   assigning the at least one of the defer range sub queries in the catalog table to the available queue as an available range sub query; and
   processing the plurality of available range sub queries in the available queue.

8. A computer program product for optimizing performance of parallel queries, the computer program product comprising:
   a computer readable storage medium having computer readable program code embodied therewith, the program code executable by a computer processor to:
   divide a query into a plurality of sub queries, wherein the query is divided according to a plurality of data ranges associated with the query;
   create an available queue and a defer queue, wherein the defer queue includes one or more of the sub queries that attempt to access data ranges associated with unavailable data;
   assign the plurality of sub queries into the available queue;
   process, in parallel, the plurality of sub queries in the available queue;

during the processing, determine a data range associated with a sub query that has attempted to access a data range associated with unavailable data;

assign the sub query to the defer queue as a defer range sub query;

assign the defer range sub query to a catalog table if the data range associated with the defer range sub query in the defer queue is still not available after a predetermined period of time, wherein the catalog table stores a query identifier, a range start point, and a range end point associated with the defer range sub query;

determining if any of the data in the data range associated with the unavailable data has become available;

assigning the defer range sub query in the defer queue to the available queue in response to the unavailable data becoming available; and after completing the processing of the plurality of sub queries in the available queue, process a plurality of defer range sub queries in the defer queue.

9. The computer program product of claim 8 wherein the computer readable program code configured to assign the sub query to the defer queue as the defer range sub query is further configured to:

continue to process the plurality of sub queries in the available queue after assigning the defer range sub query to the defer queue.

10. The computer program product of claim 8 wherein the computer readable program code configured to process the plurality of defer range sub queries in the defer queue is further configured to:

determine a data range associated with at least one defer range sub query comprises available data;

assign the at least one defer range sub query to the available queue as an available range sub query; and process the plurality of available range sub queries in the available queue.

11. The computer program product of claim 8 wherein the computer readable program code configured to:

end the processing of the query after the defer range sub query is assigned to the catalog table; and restart the processing of the query by processing at least one of the defer range sub queries in the catalog table when the respective data range associated with the defer range sub query becomes available.

12. The computer program product of claim 11 wherein the computer readable program code configured to wait the predetermined period of time is further configured to:

determine a data range associated with at least one defer range sub query in the defer queue comprises available data; and assign the at least one defer range sub query to the available queue as an available range sub query.

13. The computer program product of claim 11 further configured to:

restart the processing of the query by processing at least one of the defer range sub queries in the catalog table when the respective data range associated with the at least one of the defer range sub queries comprises available data.

14. The computer program product of claim 13 wherein the computer readable program code configured to process the at least one of the defer range sub queries in the catalog table comprises:

assign the at least one of the defer range sub queries in the catalog table to the available queue as an available range sub query; and process the plurality of available range sub queries in the available queue.

15. A system comprising:

a computing processor; and a computer readable storage medium operationally coupled to the processor, the computer readable storage medium having computer readable program code embodied therewith to be executed by the computing processor, the computer readable program code configured to:

divide a query into a plurality of sub queries, wherein the query is divided according to a plurality of data ranges associated with the query;

create an available queue and a defer queue, wherein the defer queue includes one or more of the sub queries that attempt to access data ranges associated with unavailable data;

assign the plurality of sub queries into the available queue;

process, in parallel, the plurality of sub queries in the available queue;

during the processing, determine a data range associated with a sub query that has attempted to access a data range associated with unavailable data;

assign the sub query to the defer queue as a defer range sub query;

assign the defer range sub query to a catalog table if the data range associated with the defer range sub query in the defer queue is still not available after a predetermined period of time, wherein the catalog table stores a query identifier, a range start point, and a range end point associated with the defer range sub query;

determine if any of the data in the data range associated with the unavailable data has become available;

assign the defer range sub query in the defer queue to the available queue in response to the unavailable data becoming available; and after completing the processing of the plurality of sub queries in the available queue, process a plurality of defer range sub queries in the defer queue.

16. The system of claim 15 wherein the computer readable program code configured to assign the sub query to the defer queue as the defer range sub query is further configured to:

continue to process the plurality of sub queries in the available queue after assigning the defer range sub query to the defer queue.

17. The system of claim 15 wherein the computer readable program code configured to process the plurality of defer range sub queries in the defer queue is further configured to:

determine a data range associated with at least one defer range sub query comprises available data;

assign the at least one defer range sub query to the available queue as an available range sub query; and process the plurality of available range sub queries in the available queue.

18. The system of claim 15 wherein the computer readable program code configured to:

end the processing of the query after the defer range sub query is assigned to the catalog table; and restart the processing of the query by processing at least one of the defer range sub queries in the catalog table when the respective data range associated with the defer range sub query becomes available.

19. The system of claim 18 wherein the computer readable program code configured to wait the predetermined period of time is further configured to:
   determine a data range associated with at least one defer range sub query in the defer queue comprises available data; and
   assign the at least one defer range sub query to the available queue as an available range sub query.

20. The system of claim 18 further configured to:
   restart the processing of the query by processing at least one of the defer range sub queries in the catalog table when the respective data range associated with the at least one of the defer range sub queries comprises available data.

* * * * *